(12) United States Patent
Nakagawa et al.

(10) Patent No.: US 8,918,267 B2
(45) Date of Patent: Dec. 23, 2014

(54) CONTROL APPARATUS FOR INTERNAL COMBUSTION ENGINE

(75) Inventors: Norihisa Nakagawa, Numazu (JP); Takashi Nishikiori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 175 days.

(21) Appl. No.: 13/259,665

(22) PCT Filed: Dec. 16, 2009

(86) PCT No.: PCT/JP2009/070995
§ 371 (c)(1),
(2), (4) Date: Sep. 23, 2011

(87) PCT Pub. No.: WO2011/074089
PCT Pub. Date: Jun. 23, 2011

(65) Prior Publication Data
US 2012/0022769 A1 Jan. 26, 2012

(51) Int. Cl.
*B60T 7/12* (2006.01)
(Continued)

(52) U.S. Cl.
CPC ............... *F02D 41/123* (2013.01); *Y02T 10/18* (2013.01); *F02D 13/08* (2013.01);
(Continued)

(58) Field of Classification Search
USPC ................. 123/198, 316, 90.15, 563, 568.12, 123/568.19, 568.2, 568.21, 332, 333, 672; 701/103, 104, 105, 108, 112; 60/599, 60/602, 603, 605.2
See application file for complete search history.

(56) References Cited

U.S. PATENT DOCUMENTS 4,204,483 A * 5/1980 Harada et al. .................. 123/493
5,570,575 A * 11/1996 Sato et al. ...................... 60/277
(Continued)

FOREIGN PATENT DOCUMENTS

JP 02 301608 12/1990
JP 03 000368 1/1991
(Continued)

OTHER PUBLICATIONS

International Search Report Issued Jan. 19, 2010 in PCT/JP09/070995 Filed Dec. 16, 2009.
English translation of Notification of Reason(s) for Refusal issued on Aug. 28, 2012 in Japanese Patent Application No. 2011-545891.

*Primary Examiner* — Hieu T Vo
*Assistant Examiner* — Sherman Manley
(74) *Attorney, Agent, or Firm* — Oblon, Spivak, McClelland, Maier & Neustadt, L.L.P.

(57) ABSTRACT

A control apparatus for an internal combustion engine is provided, the control apparatus being capable of effectively suppressing the inflow of fresh air into a catalyst due to an operational delay of the valve stop mechanism when an execution request for fuel cut is issued. There is provided a valve stop mechanism capable of changing the operational states of intake valves and exhaust valves between a valve operating state and a valve closed/stopped state. The operational states of the intake and exhaust valves are changed into the valve closed/stopped state, if the engine rotational speed decreases to or below a predetermined rotational speed when the engine rotational speed is higher than the predetermined rotational speed in a case where an execution request for fuel cut is detected and the temperature of the catalyst is not lower than a predetermined temperature during operation of an internal combustion engine.

4 Claims, 7 Drawing Sheets

(51) Int. Cl.
  *G05D 1/00* (2006.01)
  *G06F 7/00* (2006.01)
  *G06F 17/00* (2006.01)
  *F02D 13/08* (2006.01)
  *F02D 41/12* (2006.01)
  *F02D 41/08* (2006.01)
  *F02D 41/00* (2006.01)
  *F02D 41/02* (2006.01)

(52) U.S. Cl.
  CPC .......... *F02D 41/08* (2013.01); *F02D 2041/001* (2013.01); *F02D 2200/0802* (2013.01); *F02D 41/0002* (2013.01); *F02D 41/0235* (2013.01); *F02D 2200/101* (2013.01); *F02D 41/0087* (2013.01); *Y02T 10/42* (2013.01)
  USPC ................. 701/103; 123/198 DB; 123/325; 123/481; 60/277

(56) References Cited

U.S. PATENT DOCUMENTS

| | | | | |
|---|---|---|---|---|
| 6,526,745 | B1 * | 3/2003 | Ogiso | 60/285 |
| 7,051,514 | B2 * | 5/2006 | Midlam-Mohler | 60/278 |
| 7,434,385 | B2 * | 10/2008 | Ichimoto et al. | 60/277 |

FOREIGN PATENT DOCUMENTS

| | | |
|---|---|---|
| JP | 05 018281 | 1/1993 |
| JP | 10 030477 | 2/1998 |
| JP | 10 082334 | 3/1998 |
| JP | 2001 090564 | 4/2001 |
| JP | 2001 182570 | 7/2001 |
| JP | 2003 074385 | 3/2003 |
| JP | 2008 291850 | 12/2008 |

* cited by examiner

CONTROL APPARATUS FOR INTERNAL COMBUSTION ENGINE

TECHNICAL FIELD

The present invention relates to a control apparatus for an internal combustion engine, and particularly to a control apparatus for an internal combustion engine including a valve stop mechanism that can maintain at least one of an intake valve and an exhaust valve in a valve closed/stopped state.

BACKGROUND ART

Conventionally, for example, Patent Document 1 discloses an internal combustion engine having a variable valve operating mechanism (valve stop mechanism) that can maintain at least one of an intake valve and an exhaust valve thereof in a valve closed state. This conventional internal combustion engine is configured to control the variable valve operating mechanism such that at least one of the intake valve and the exhaust valve is kept in a valve closed state when fuel cut is performed under the condition that the temperature of an exhaust gas purifying catalyst disposed in an exhaust gas passage is not lower than a predetermined temperature. This configuration intends to suppress the degradation of the exhaust gas purifying catalyst by preventing oxygen-rich gas from being supplied to the exhaust gas purifying catalyst in a high temperature state.

It is noted that the applicant of the present invention recognizes the following literatures including the above described literature as the related art of the present invention.

CITATION LIST

Patent Literature

Patent Document 1: Japanese Laid-open Patent Application Publication No. 2001-182570
Patent Document 2: Japanese Laid-open Patent Application Publication No. 05-18281
Patent Document 3: Japanese Laid-open Patent Application Publication No. 03-000368
Patent Document 4: Japanese Laid-open Patent Application Publication No. 02-301608
Patent Document 5: Japanese Laid-open Patent Application Publication No. 2001-090564
Patent Document 6: Japanese Laid-open Patent Application Publication No. 10-082334

SUMMARY OF INVENTION

Technical Problem

By the way, a previously known valve stop mechanism of mechanical type or hydraulic type has a control delay and an activation delay of its actuator. Therefore, the valve stop mechanism requires a predetermined response time depending on the specification of the valve stop mechanism during a time since a valve stop command is issued until the transition to a valve stopped state is completed. Moreover, as an engine rotational speed increases, time per a unit crank angle decreases. Therefore, while the engine rotational speed is high, the number of cycles of the internal combustion engine that passes during the above described response time of the valve stop mechanism increases. Because of this, when an execution request for fuel cut that is accompanied by a valve stop request is issued while the engine rotational speed is high, there is a concern that a large amount of fresh air flows into the catalyst due to the operational delay of the valve stop mechanism. Such a problem has not been implied in prior arts.

The present invention has been made in order to solve the problems as described above, and its object is to provide a control apparatus for an internal combustion engine that can effectively suppress the inflow of fresh air into the catalyst due to an operational delay of the valve stop mechanism when an execution request for fuel cut is issued.

Solution to Problem

A first aspect of the present invention is a control apparatus for an internal combustion engine, comprising:
a valve stop mechanism which is capable of changing an operational state of at least one of an intake valve and an exhaust valve between a valve operating state and a valve closed/stopped state;
fuel cut execution request detecting means which detects a presence or absence of an execution request for fuel cut during operation of an internal combustion engine;
catalyst temperature acquisition means which acquires a temperature of a catalyst disposed in an exhaust passage of the internal combustion engine; and
valve stop execution means which changes an operational state of at least one of the valves into a valve closed/stopped state, if an engine rotational speed decreases to or below a predetermined rotational speed when the engine rotational speed is higher than the predetermined rotational speed in a case where the execution request for fuel cut is detected and the temperature of the catalyst is not lower than a predetermined temperature.

Moreover, a second aspect of the present invention is the control apparatus for an internal combustion engine according to the first aspect of the present invention, further comprising:
rotational speed reduction means which forcefully reduces the engine rotational speed to or below the predetermined rotational speed, when the engine rotational speed is higher than the predetermined rotational speed in a case where the execution request for fuel cut is detected.

Moreover, a third aspect of the present invention is the control apparatus for an internal combustion engine according to the first or second aspect of the present invention, further comprising:
fuel cut delaying means which delays the execution of fuel cut at the same timing when the changing of the operational state of the at least one of the valves into the valve closed/stopped state is delayed until the engine rotational speed decreases to or below the predetermined rotational speed, in a case where the execution request for fuel cut is detected.

Moreover, a fourth aspect of the present invention is the control apparatus for an internal combustion engine according to the third aspect of the present invention,
wherein the fuel cut delaying means executes the fuel cut in synchronization with the execution of an operation to change the operational state of the at least one of the valves into the valve closed/stopped state by the valve stop execution means.

Moreover, a fifth aspect of the present invention is the control apparatus for an internal combustion engine according to any one of the first to fourth aspects of the present invention,
wherein the predetermined rotational speed is an engine rotational speed at which it is possible to obtain a response performance of the valve stop mechanism which is needed to complete the changing of the operational state of the at least one of the valves and the execution of fuel cut in a same cycle, in a case where the changing of the operational state of the at least one of the valves into the valve closed/stopped state, and the execution of fuel cut are commanded at the same time.

Advantageous Effects of Invention

According to the first aspect of the present invention, in a case where an execution request for fuel cut is detected and the temperature of the catalyst is not lower than the above described predetermined temperature, when the engine rotational speed is higher than a predetermined rotational speed, the execution of the operation to change the operational state of at least one of the valves into a valve closed/stopped state is delayed until the engine rotational speed decreases to or below the predetermined rotational speed. As the engine rotational speed decreases, time per a unit crank angle increases and it becomes easier to ensure a response time of the valve stop mechanism. Thus, according to the present invention, it is possible to effectively suppress the inflow of fresh air into the catalyst due to an operational delay of the valve stop mechanism when an execution request for fuel cut is issued. This makes it possible to suppress the degradation of the catalyst.

According to the second aspect of the present invention, by providing rotational speed reduction means, it is possible to effectively reduce the time from the detecting of an execution request for fuel cut to the execution of fuel cut.

According to the third aspect of the present invention, by delaying the execution timing of fuel cut at the same timing when the changing of the operational state of the at least one of the vales into the valve closed/stopped state is delayed, it is possible to suppress the inflow of fresh air into the catalyst compared with a case where the execution timing of fuel cut is not delayed as in such a manner.

According to the fourth aspect of the present invention, it becomes possible to reliably suppress the inflow of fresh air into the catalyst in a case where the engine rotational speed is higher than the predetermined rotational speed when an execution request for fuel cut is detected.

According to the setting of the predetermined rotational speed in the fifth aspect of the present invention, it becomes possible to reliably suppress the inflow of fresh air into the catalyst in a case where the engine rotational speed is higher than the predetermined rotational speed when an execution request for fuel cut is detected.

Figure 1:
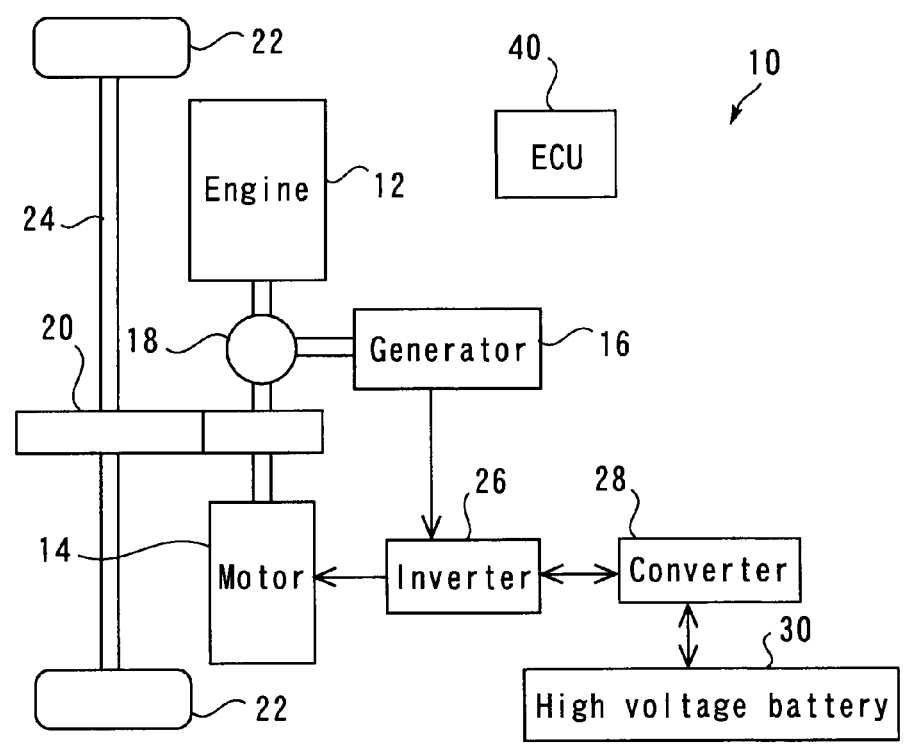
FIG. 1 is a diagram to show an outline configuration of a drive system of a hybrid vehicle to which the present invention is applied.

DESCRIPTION OF SYMBOLS 10 drive system of hybrid vehicle
12 internal combustion engine
14 motor for driving vehicle
16 generator
18 power split mechanism
40 ECU (Electronic Control Unit)
44 combustion chamber
46 intake passage
48 exhaust passage
56 fuel injection valve
58 ignition plug
60 intake valve
62 exhaust valve
64 intake variable valve operating apparatus
66 exhaust variable valve operating apparatus
68 catalyst
72 crank angle sensor
98 valve stop mechanism
108 driving means

DESCRIPTION OF EMBODIMENTS

First Embodiment

[Configuration of HV System]

FIG. 1 is a diagram to show an outline configuration of a drive system 10 of a hybrid vehicle to which the present invention is applied. This drive system 10 includes an internal combustion engine 12 and a motor for driving the vehicle (hereafter, simply referred to as a "motor") 14 as the power source for the vehicle. Moreover, the drive system 10 also includes a generator 16 that receives the supply of a driving force to generate electric power.

The internal combustion engine 12, the motor 14, and the generator 16 are interlinked via a power split mechanism 18 of planetary gear type. To be more specific, the rotating shaft of a planetary carrier (not shown) in the power split mechanism 18 and a below described crankshaft 70 of the internal combustion engine 12 are linked. Moreover, the rotating shaft of a ring gear (not shown) in the power split mechanism 18 and the rotating shaft of the motor 14 are directly linked. Moreover, the rotating shaft of a sun gear (not shown) in the power split mechanism 18 and the rotating shaft of the generator 16 are linked. Furthermore, a speed reducer 20 is connected to the rotating shaft of the motor 14 in connection with the power split mechanism 18. The speed reducer 20 links the rotating shaft of the motor 14 with a driving shaft 24 which leads to driving wheels 22. The power split mechanism 18 is an apparatus to split the driving force of the internal combustion engine 12 into the generator 16 side and the speed reducer 20 side. The distribution of the driving force by the power split mechanism 18 can be freely changed.

The drive system 10 further includes an inverter 26, a converter 28, and a high voltage battery 30. The inverter 26 is connected to the generator 16 and the motor 14, and is also connected to the high voltage battery 30 via the converter 28. The electric power generated at the generator 16 can be supplied to the motor 14 via the inverter 26, and also can be charged to the high voltage battery 30 via the inverter 26 and the converter 28. Moreover, the electric power charged in the high voltage battery 30 can be supplied to the motor 14 via the converter 28 and the inverter 26.

According to the drive system 10 as so far described, based on a predetermined condition the driving wheels 22 can be rotated by the driving force of the internal combustion engine 12 alone with the motor 14 being deactivated, and conversely the driving wheels 22 can be rotated by the driving force of the motor 14 alone with the internal combustion engine 12 being deactivated. Moreover, it is also possible to activate both of the motor 14 and the internal combustion engine 12 and to rotate the driving wheel 22 by both the driving forces. Further, it is also possible to increase or decrease the rotational speed (the engine rotational speed) of the internal combustion engine 12 in operation, by increasing or decreasing the rotational speed of the generator 16.

The drive system 10 of the present embodiment is controlled by an ECU (Electronic Control Unit) 40. The ECU 40 comprehensively controls the entire drive system 10 including the internal combustion engine 12, the motor 14, the generator 16, the power split mechanism 18, the inverter 26, the converter 28, and the like.

[System Configuration of Internal Combustion Engine]

Figure 2:
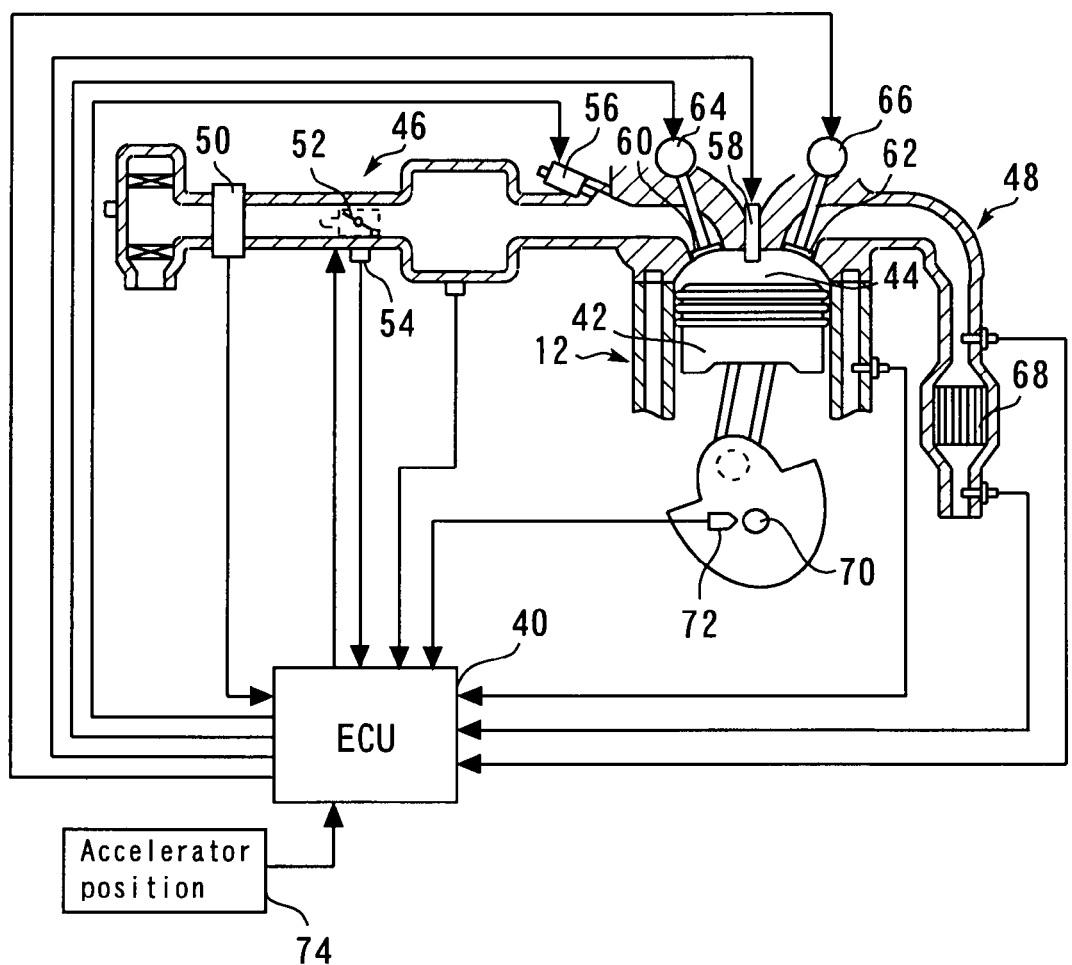
FIG. 2 is a diagram to illustrate the system configuration of the internal combustion engine shown in FIG. 1.

FIG. 2 is a diagram to illustrate the system configuration of the internal combustion engine 12 shown in FIG. 1. The system shown in FIG. 1 includes the internal combustion engine 12. Although the number of cylinders and the cylinder configuration of the internal combustion engine in the present invention are not particularly limited, it is supposed in the present embodiment that the internal combustion engine 12 is an in-line 4-cylinder type engine having four cylinders from No. 1 to No. 4 cylinders. A piston 42 is provided in a cylinder of the internal combustion engine 12. A combustion chamber 44 is formed on the top side of the piston 42 in the cylinder of the internal combustion engine 12. An intake passage 46 and an exhaust passage 48 are in communication with the combustion chamber 44.

An airflow meter 50 that outputs a signal according to the flow rate of air to be sucked into the intake passage 46 is provided near the inlet of the intake passage 46. A throttle valve 52 is provided in the downstream of the airflow meter 50. The throttle valve 52 is an electronically controlled throttle valve which can control a throttle opening position independent of an opening position of an accelerator. A throttle position sensor 54 for detecting the throttle opening is disposed near the throttle valve 52.

Moreover, a fuel injection valve 56 for injecting fuel into an intake port of the internal combustion engine 12 is disposed in the downstream of the throttle valve 52. Furthermore, an ignition plug 58 for igniting an air-fuel mixture in the combustion chamber 44 is attached to a cylinder head provided in the internal combustion engine 12. Intake valves 60 and exhaust valves 62 for bringing the combustion chamber 44 and the intake passage 46, or the combustion chamber 44 and the exhaust passage 48 into a conducting state or a blocked state are provided at the intake port and an exhaust port, respectively.

The intake valves 60 and the exhaust valves 62 are respectively driven by an intake variable valve operating apparatus 64 and an exhaust variable valve operating apparatus 66. These variable valve operating apparatuses 64 and 66 respectively include a valve stop mechanism 98 that can maintain the intake valves 60 and the exhaust valves 62 to be in a valve closed state as will be described later with reference to FIGS. 3 to 6. Moreover, a catalyst 68 for purifying exhaust gas is disposed in the exhaust passage 48.

Along with the various sensors as described above, various sensors for controlling the internal combustion engine 12, such as a crank angle sensor 72 for detecting a rotational angle (crank angle) of the crankshaft 70 and an engine rotational speed, and an accelerator position sensor 74 for detecting the position of an accelerator pedal of a hybrid vehicle which is mounted with the internal combustion engine 12, are electrically connected to an input of the above described ECU 40. Moreover, various actuators such as a fuel injection valve 56 are electrically connected to the ECU 40. The ECU 40 controls the operating state of the internal combustion engine 12 based on the outputs of these sensors.

[Configuration of Variable Valve Operating Apparatus]

Next, with reference to FIGS. 3 to 6, the configuration of a variable valve operating apparatus of the present embodiment and the operation thereof will be described. It is noted that since the intake variable valve operating apparatus 64 and the exhaust variable valve operating apparatus 66 have similar configurations, description will be made, herein, by taking example of the intake variable valve operating apparatus 64.

Figure 3:
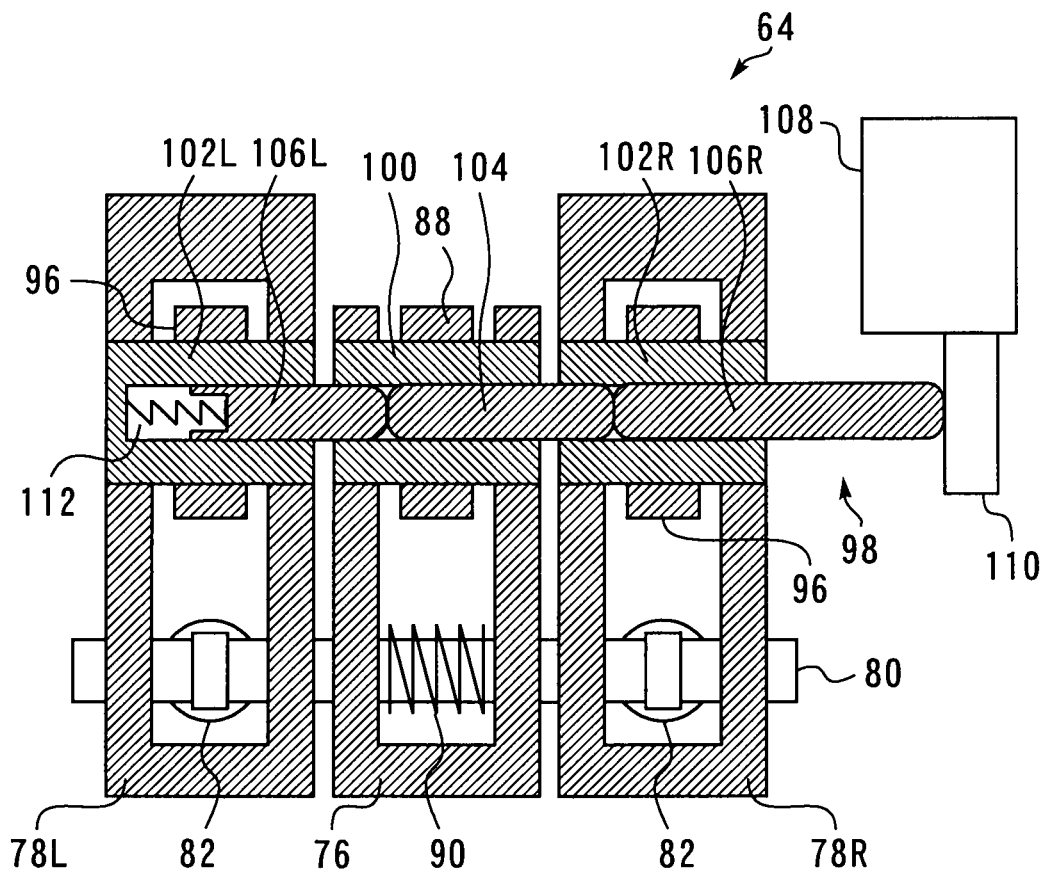
FIG. 3 is a sectional view of a first rocker arm and second rocker arms, which are included in the intake variable valve operating apparatus.
Figure 5:
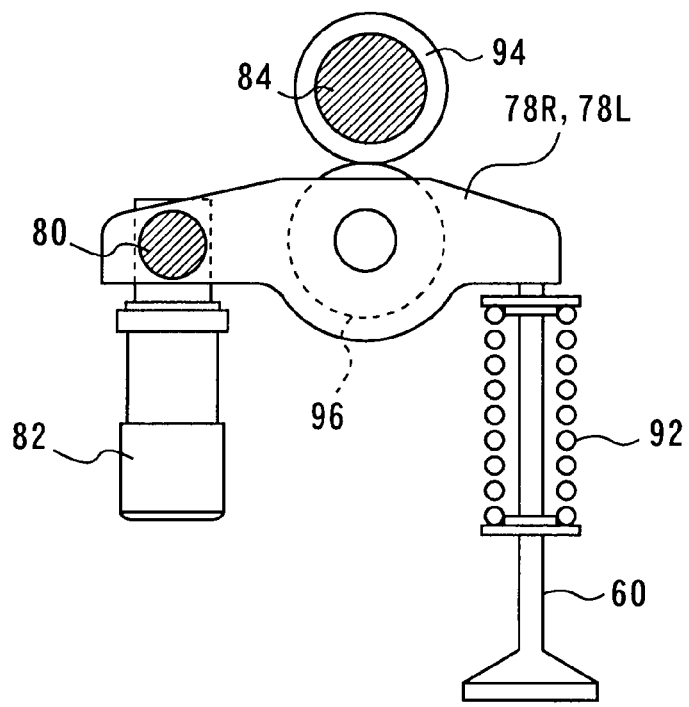
FIG. 5 is a side view of the second rocker arms.
Figure 6:
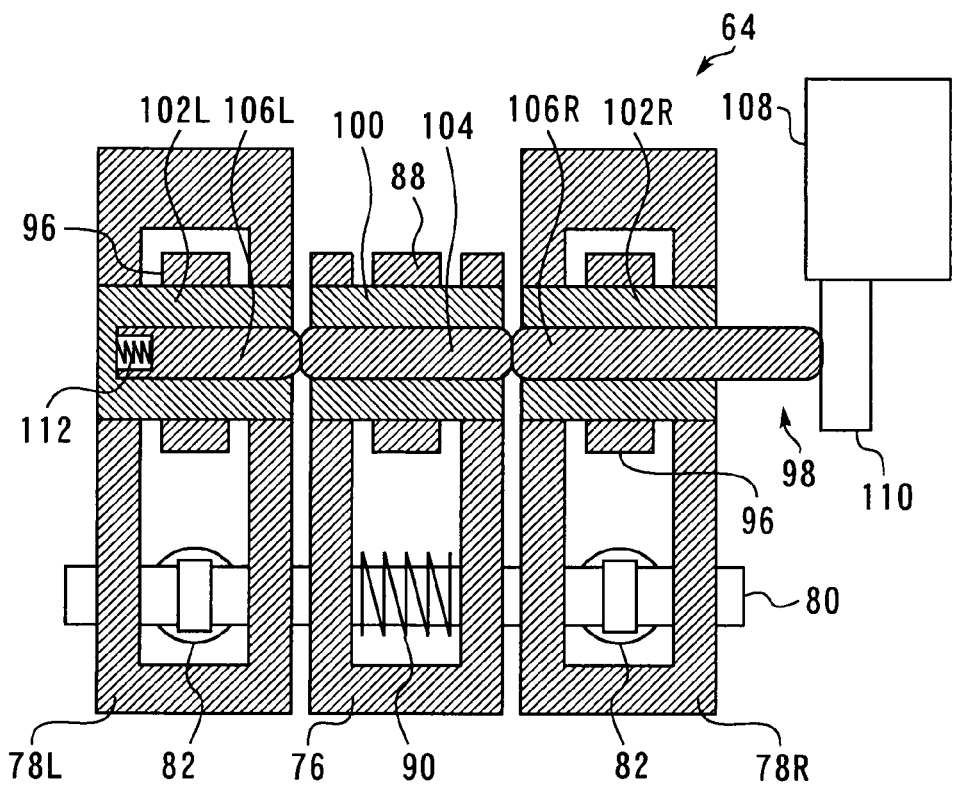
FIG. 6 is a sectional view of a first rocker arm and second rocker arms, which are included in the intake variable valve operating apparatus.

FIGS. 3 and 6 are sectional views of a first rocker arm 76 and second rocker arms 78R and 78L, which are included in the intake variable valve operating apparatus 64, respectively. Moreover, FIG. 4 is a side view of the first rocker arm 76, and FIG. 5 is a side view of the second rocker arms 78R and 78L.

As shown in FIG. 3, the intake variable valve operating apparatus 64 includes a first rocker arm 76 and a pair of second rocker arms 78R and 78L which are disposed both sides thereof in each cylinder. These rocker arms 76, 78R and 78L are adapted to be rockable centering around a common rocker shaft 80. The rocker shaft 80 is supported by the cylinder head of the internal combustion engine 12 via a pair of hydraulic lash adjusters 82.

Figure 4:
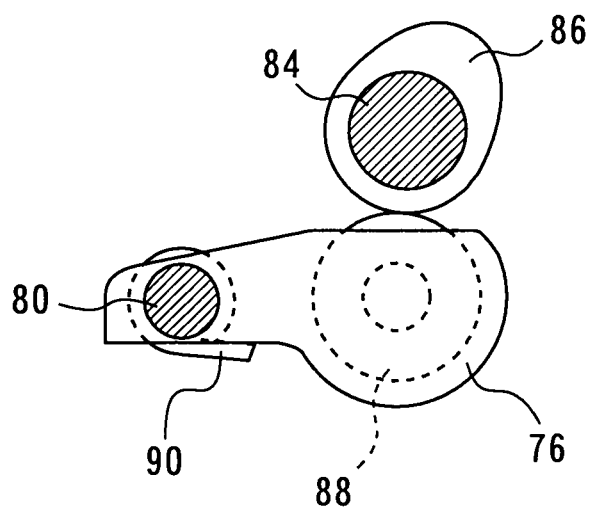
FIG. 4 is a side view of the first rocker arm.

As shown in FIG. 4, the intake variable valve operating apparatus 64 has a camshaft 84. The camshaft 84 is linked with the crankshaft 70 via a timing chain or the like, and rotates at a speed of one half of that of the crankshaft 70. The camshaft 84 includes a lift cam 86 for driving the intake valve 60 to open and close. On one hand, a first roller 88 is provided in the first rocker arm 76. The first rocker arm 76 is biased in the counterclockwise direction in FIG. 4 by a torsion coil spring 90. The first roller 88 is pushed against the lift cam 86 by the biasing force. This configuration causes the first rocker arm 76 to rock as the lift cam 86 rotates.

As shown in FIG. 5, movable ends of the second rocker arms 78R and 78L are respectively in abutment with the ends of the valve stems of the two intake valves 60. The intake valve 60 is biased in the valve-closing direction by a valve spring 92. The camshaft 84 includes a pair of zero lift cams 94 on both sides of the lift cam 86. The zero lift cam 94 takes on a perfect circle having the same radius as that of the base circle of the lift cam 86. The second rocker arms 78R and 78L are each provided with a second roller 96. The outer diameter of the roller 96 is equal to that of the first roller 88 provided in the first rocker arm 76. Moreover, the distance between the centers of the rocker shaft 80 and the second roller 96 is equal to the distance between the centers of the rocker shaft 80 and the first roller 88. While the intake valve 60 is closed, the second roller 96 is in abutment with the zero lift cam 94.

The intake variable valve operating apparatus 64 includes a valve stop mechanism that switches between a linked state and a separated state of the first rocker arm 76 and the second rocker arms 78R and 78L. The valve stop mechanism 98 is configured to be able to switch the operational state of the intake valves 60 between a valve operating state and a valve closed/stopped state by switching between the state in which the acting force of the lift cam 86 is transferred to the second rocker arms 78R and 78L via the first rocker arm 76, and the state in which the acting force is not transferred to the second rocker arms 78R and 78L.

As shown in FIG. 3, the first rocker arm 76 has a first sleeve 100 that is concentrically disposed with respect to the first roller 88, and the second rocker arms 78R and 78L respectively have second sleeves 102R and 102L that are concentrically disposed with respect to the second roller 96.

In the state shown in FIG. 3, a part of a first pin 104 a major part of which is inserted into the first rocker arm 76 is inserted into the second sleeve 102R of the second rocker arm 78R, and a part of a second pin 106L a major part of which is inserted into the second rocker arm 78L is inserted into the first sleeve 100 of the first rocker arm 76. This results in that the first rocker arm 76 and the second rocker arm 78R are linked via the first pin 104, and the first rocker arm 76 and the second rocker arm 76L are linked via the second pin 106L. Thus, when the first rocker arm 76 rocks as the lift cam 86 rotates, concurrently with this, the second rocker arms 78R and 78L rock and thereby causing the intake valves 60 to open and close.

One end of the second pin 106R projects beyond the side face of the second rocker arm 78R. This projected one end of the second pin 106R is in abutment with a displacement member 110 of driving means 108. The driving means 108 is configured to have a magnetic solenoid therewithin so as to be able to displace the displacement member 110 in a left and right direction in FIG. 3 according to a command of the ECU 40.

One end of the second sleeve 102L of the second rocker arm 78L is closed, and a return spring 112 is placed therein. This return spring 112 presses the second pin 106L in the right direction in FIG. 3. This causes the first pin 104 and the second pins 106R and 106L to be biased in the right direction in FIG. 3.

In a linked state shown in FIG. 3, if the driving means 108 displaces the displacement member 110 in the left direction in FIG. 3 with a force overcoming the biasing force of the return spring 112, the first pin 104 and the second pins 106R and 106L move in the left direction in FIG. 3, thereby turning into a state shown in FIG. 6. In this state, the first pin 104 and the second pin 106L are in abutment with each other in the gap between the first rocker arm 76 and the second rocker arm 78L, and the first pin 104 and the second pin 106R are in abutment with each other in the gap between the first rocker arm 76 and the second rocker arm 78R. As a result of this, even if the first rocker arm 76 rocks as the lift cam 86 rotates, that rocking will not be transferred to the second rocker arms 78R and 78L. Then, the second rollers 96 of the second rocker arms 78R and 78L is in contact with the zero lift cams 94 that have no cam noses. As a result of this, even when the camshaft 84 rotates, the second rocker arms 78R and 78L will not rock, and the intake valves 60 turn into the valve closed/stopped state.

Moreover, in the state shown in FIG. 6, that is, in the state in which the first rocker arm 76 and the second rocker arms 78R and 78L are separated, when the first roller 88 of the first rocker arm 76 is in contact with the base circle of the lift cam 86 as shown in FIG. 4, the centers of the three pins 104, 106R and 106L coincide. At this moment, by activating the driving means 108 to move these pins 104, 106R and 106L in the right direction in FIG. 6, it is possible to switch into the linked state shown in FIG. 3.

As so far described, the intake valve variable operating apparatus 64 is capable of switching the operational state of the intake valves 60 between the valve operating state and the valve closed/stopped state, by switching the linked state and the separated state between the first rocker arm 76 and the second rocker arms 78R and 78L. Moreover, such switching of the operational state of the intake valves 60 can be freely performed for each cylinder. Further, it is possible to switch the operational state of the exhaust valves 62 between the valve operating state and the valve closed/stopped state for each cylinder by the exhaust variable valve operating apparatus 66 that is configured in a similar manner with the intake variable valve operating apparatus 64. Hereafter, in the present description, a control to switch the operational states of the intake valves 60 and the exhaust valves 62 from the valve operating state to the valve closed/stopped state is referred to as "valve stop control".

[Control of First Embodiment Upon Execution Request for Fuel Cut]

When the catalyst 68 disposed in the exhaust passage 48 is in a high-temperature state, if oxygen-rich gas is supplied to the catalyst 68, there is a concern that the catalyst 68 is degraded. In order to suppress the degradation of the catalyst 68 when an execution request for fuel cut is issued during deceleration or the like, it is effective to prevent fresh air (intake air) from being supplied to the catalyst 68. To do that, it is desirable that upon execution of fuel cut, the operational states of the intake valves 60 and the exhaust valves 62 be switched into the valve closed/stopped state in the same cycle as that in which the execution of fuel cut is started, and it is also desirable that upon returning from fuel cut, the operational states be switched from the valve closed/stopped state to the valve operating state in the same cycle as that in which the returning from fuel cut is started.

However, the valve stop mechanism 98 included in the above described variable valve operating apparatuses 64 and 66 has a control delay and an activation delay of the driving means (electromagnetic solenoid) 108. Therefore, the valve stop mechanism 98 requires a predetermined response time during a time since a command for switching the operational states of the intake and exhaust valves 60 and 62 into the valve closed/stopped state (hereafter, simply referred to as a "valve stop command") is issued until the transition to the valve closed/stopped state is completed. To be more specific, in the case of the configuration of the valve stop mechanism 98, a total time of the response delay time of the driving means (electromagnetic solenoid) 108, the time required for the pins 104, 106L and 106R to finish their actions in association with the action of the displacement member 110, and the like become necessary as the above described response time. It is noted that if a hydraulic valve stop mechanism is included, a total time of a response delay time of the electromagnetic solenoid for switching oil passages, a time needed for reaching an oil pressure at which switching to the valve closed/ stopped state becomes possible, a time necessary for the valve stop mechanism to complete its action by an increased oil pressure, and the like will become necessary as the above described response time. Moreover, when performing the returning from the valve closed/stopped state to the valve operating state, the valve stop mechanism 98 requires a predetermined response time as well.

Moreover, as the engine rotational speed increases, time per a unit crank angle decreases. Thereby, in a region of high engine rotational speed, it becomes unable to sufficiently ensure the above described response time of the valve stop mechanism 98. As a result of that, a delay will occur in the switching operation to the valve closed/stopped state with respect to the execution operation of fuel cut. That is, it becomes unable to synchronize the execution completion of fuel cut and the execution completion of valve stop control. Therefore, since a higher engine rotational speed will result in a larger number of cycles of the internal combustion engine 12 that passes during the above described response time of the valve stop mechanism 98, when an execution request for fuel cut accompanied by valve stop control is issued while the engine rotational speed is high, there is concern that a large amount of fresh air enters into the catalyst 68 due to an operational delay of the valve stop mechanism 98.

On one hand, if it becomes unable to ensure the above described response time of the valve stop mechanism 98 during a return operation from fuel cut, a delay will occur in the return operation from the valve closed/stopped state with respect to the return operation from fuel cut. Then, since air and fuel will not be sucked into the cylinder, a torque will not be generated, thereby causing the driver to have a sluggish feel. Thereafter, even when the return operation from the valve closed/stopped state is completed, the fuel which has been injected and collected in the intake port due to the return delay will be sucked into the cylinder at a time upon valve returning. As a result, a misfire will occur due to an enrichment of air fuel ratio, thereby causing the driver to have a sluggish feel. Moreover, the exhaust emission performance will be degraded.

Then, the present embodiment is configured such that in a case where an execution request for fuel cut is detected and the temperature of the catalyst 68 is equal to or higher than a predetermined temperature, when the engine rotational speed is higher than a predetermined rotational speed ("valve-stop-execution permission rotational speed" to be described below with reference to FIG. 7), a valve stop command is issued to the variable valve operating apparatuses 64 and 66 after the engine rotational speed decreases to or below the above described rotational speed. It is further configured such that after the engine rotational speed has decreased to or below the above described predetermined rotational speed, an execution command for fuel cut is issued to the fuel injection valve 56 in synchronization with the valve stop command.

Figure 7:
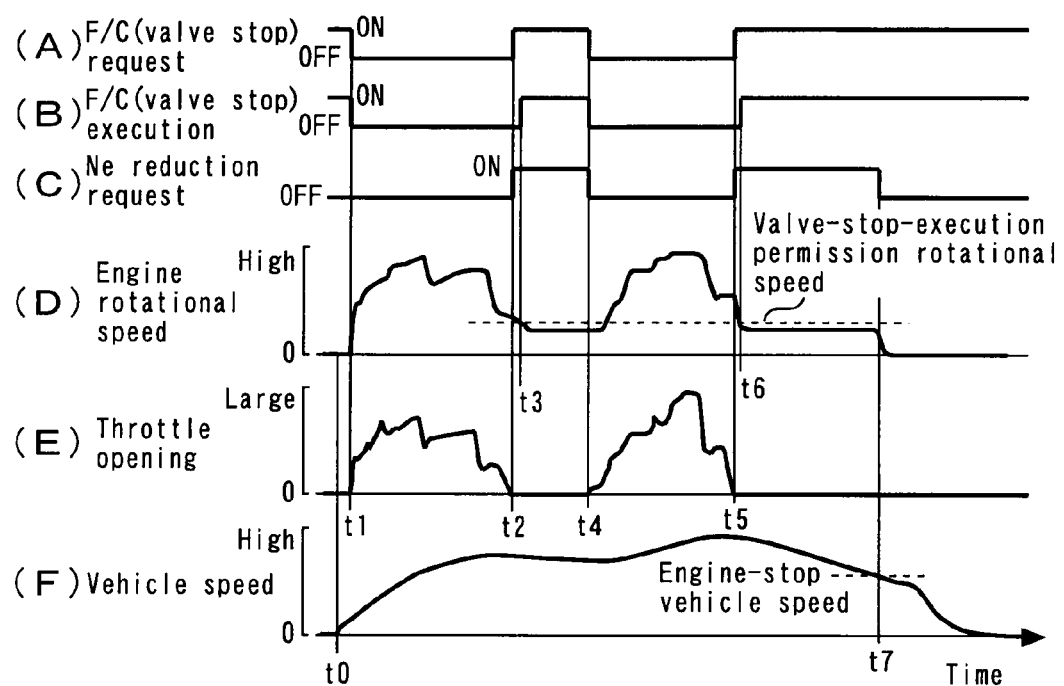
FIG. 7 is a time chart to illustrate characteristic control during an execution request for fuel cut in the first embodiment of the present invention.

FIG. 7 is a time chart to illustrate characteristic control during an execution request for fuel cut in the first embodiment of the present invention. To be more specific, FIG. 7 shows an example of a running pattern from a start to a stop in a hybrid vehicle which is equipped with the internal combustion engine 12.

In the example shown in FIG. 7, the hybrid vehicle has started at time t0 by utilizing the motor 14, and thereafter the internal combustion engine 12 has started at time t1. After the start, as the throttle opening is increased as shown in FIG. 7(E), the engine rotational speed increases as shown in FIG. 7(D) and the vehicle speed is raised as shown in FIG. 7(F).

In the example shown in FIG. 7, an execution request for fuel cut (valve stop) is detected at time t2 as shown in FIG. 7(A). In the present embodiment, in a case where such an execution request for fuel cut is issued, when the temperature of the catalyst 68 is not lower than a predetermined temperature and the engine rotational speed is higher than the valve-stop-execution permission rotational speed, an execution request for Ne reduction control to reduce the engine rotational speed to or below the valve-stop-execution permission rotational speed is issued as shown in FIG. 7(C).

In the present embodiment, at time t3 at which the engine rotational speed has decreased to or below the valve-stop-execution permission rotational speed as a result of that the above described Ne reduction control has been performed, a valve stop command is issued, and an execution command for fuel cut is issued in synchronization with the valve stop command. That is to say, at time t3, the execution of valve stop control and the execution of fuel cut started at the same time.

Moreover, in the example shown in FIG. 7, when a return request from the fuel cut (a return request from the valve stop) is detected at time t4 during the execution of the fuel cut, the return operation from the valve closed/stopped state and the return operation from the fuel cut (restarting operation of fuel injection) are executed at the same time. In this case, further, the above described Ne reduction control is canceled. Thereafter, even when an execution request for fuel cut is detected at time t5, a similar control to that described above is executed. Thereafter, at time t7, if the vehicle speed decreases to a predetermined engine-stop vehicle speed to stop the internal combustion engine as shown in FIG. 7(F), the operation of the internal combustion engine is stopped. It is noted that in the example shown in FIG. 7, thereafter the hybrid vehicle is put into a stopped state.

[Concrete Processing in First Embodiment]

Figure 8:
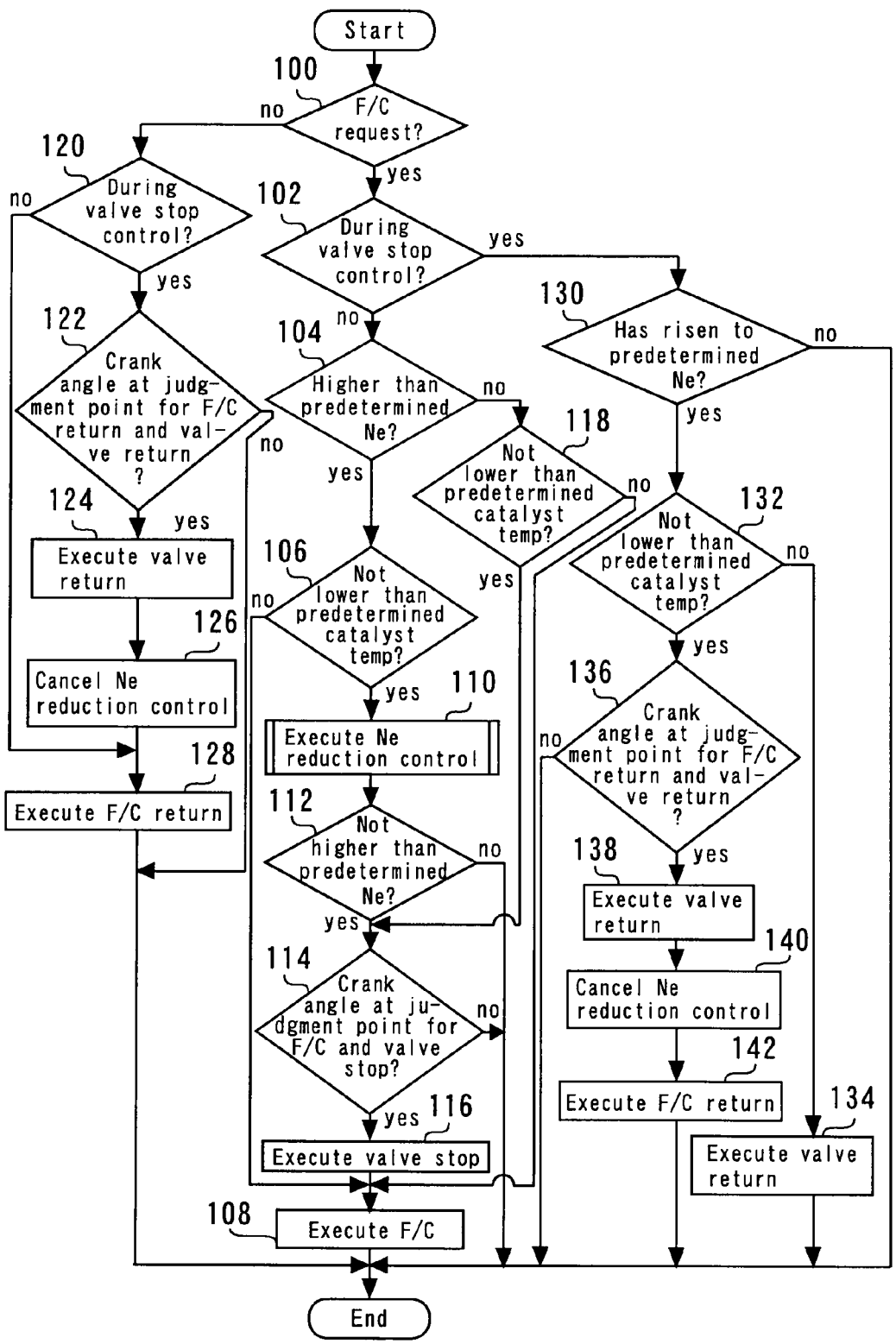
FIG. 8 is a flowchart of a main routine that is executed in the first embodiment of the present invention.

Next, concrete processing contents of control which is characteristic to the present embodiment will be described with reference to FIGS. 8 and 9. FIG. 8 is a flowchart to show a main routine executed by the ECU 40.

In the routine shown in FIG. 8, first, it is determined whether or not an execution request for fuel cut (F/C) is present (step 100). Examples of the case where fuel cut is executed during the operation of the internal combustion engine 12 include a case of deceleration, a case of high speed rotation where the engine rotational speed has reached an upper-limit rotational speed, and the like. If as a result, it is determined that there is an F/C execution request, then it is determined whether or not the valve stop control is being executed (step 102).

If it is determined that the valve stop control is not being executed in above described step 102, then it is determined whether or not the engine rotational speed is higher than the predetermined rotational speed (the above described valve-stop-execution permission rotational speed) (step 104). As the engine rotational speed decreases, time per a unit crank angle increases. As a result of that, it becomes easier to ensure a response time for the valve stop mechanism 98. The above described valve-stop-execution permission rotational speed is an engine rotational speed at which it is possible to obtain a response performance of the valve stop mechanism 98 which is necessary to finish the changing of the operational states of the intake and exhaust valves 60 and 62 into the valve closed/stopped state, and the execution of fuel cut within the same cycle of the internal combustion engine 12, when a valve stop command and an execution command for fuel cut are issued at the same time. It is noted that the valve-stop-execution permission rotational speed is a different value depending on the specification of the valve stop mechanism, and can be obtained in advance by testing or the like.

If it is determined that the engine rotational speed is higher than the above described valve-stop-execution permission rotational speed in the above described step 104, then it is determined whether or not the temperature of the catalyst 68 is not lower than a predetermined temperature (step 106). The predetermined temperature in this step 106 is a value which is specified in advance as a threshold vale for determining whether or not there is a concern for the degradation of the catalyst 68 by the inflow of fresh air into the catalyst 68. It is noted that the temperature of the catalyst 68 can be, for example, estimated based on the operational history of the internal combustion engine 12 or may be acquired by a temperature sensor.

If it is determined that the temperature of the catalyst 68 is lower than the above described predetermined temperature in the above described step 106, that is, it can be judged that there is no concern for the degradation of the catalyst 68, then F/C is immediately executed without being accompanied by the valve stop control (step 108). On one hand, if it is determined that the temperature of the catalyst 68 is not lower than the above described predetermined temperature in above described step 106, that is, it can be judged that there is concern for the degradation of the catalyst 68, then the above described Ne reduction control is executed (step 110).

Figure 9:
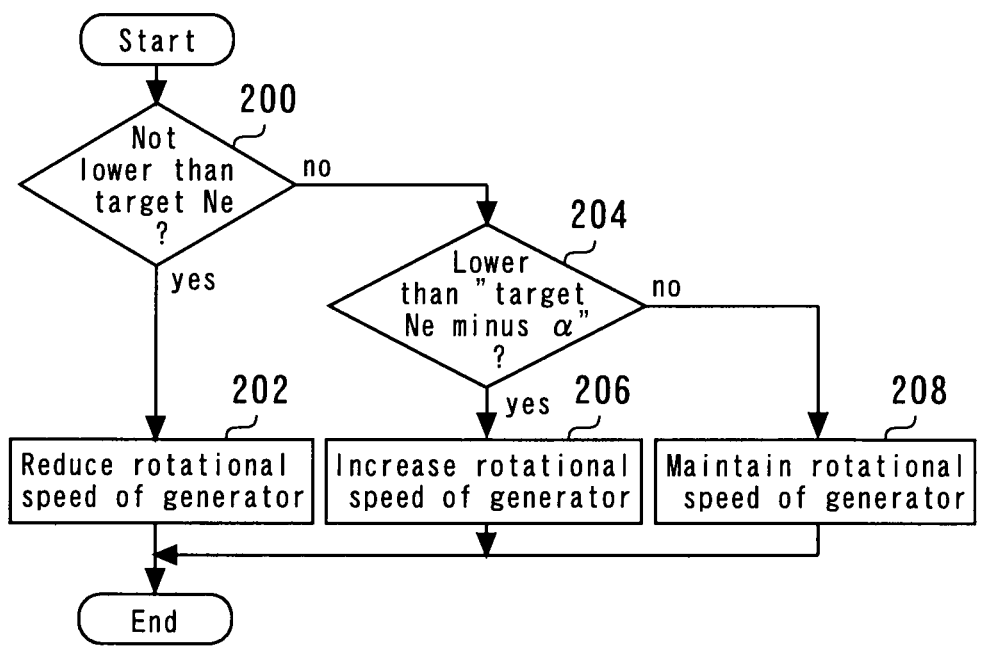
FIG. 9 is a flowchart of a sub routine that is executed in the first embodiment of the present invention.

FIG. 9 is a flowchart of a subroutine to be executed by the ECU 40 to implement the Ne reduction control in step 110 of the routine shown in FIG. 8.

In the routine shown in FIG. 9, it is determined whether or not the current engine rotational speed is not lower than a target rotational speed which is lower than the above described valve-stop-execution permission rotational speed by a predetermined rotational speed (step 200). If, as a result, the determination of present step 200 is positive, control to reduce the rotational speed of the generator by a predetermined rotational speed is executed (step 202). According to the configuration of the above described power split mechanism 18, it is possible to reduce the engine rotational speed by reducing the rotational speed of the generator 16.

On one hand, if it is determined that the current engine rotational speed is lower than the above described target rotational speed in present step 200, then it is determined whether or not the current engine speed is lower than a rotational speed which is obtained by subtracting a predetermined value a from the above described target rotational speed (step 204). If, as a result, the determination of step 204 described above is positive, control to increase the rotational speed of the generator 16 by a predetermined rotational speed is executed (step 206). This allows the engine rotational speed to increase. Moreover, if the determination of step 204 described above is negative, the rotational speed of the generator 16 is maintained at the current rotational speed (step 208). According to the Ne reduction control by the above described subroutine shown in FIG. 9, it is possible to maintain the engine rotational speed at the above described target rotational speed which is lower than the above described valve-stop-execution permission rotational speed by a predetermined rotational speed.

In the main routine shown in FIG. 8, after the Ne reduction control is executed in step 110 described above, then, it is determined whether or not the engine rotational speed has decreased to or below the predetermined rotational speed (the above described valve-stop-execution permission rotational speed) (step 112). If, as a result, it is determined that the engine rotational speed has decreased to or below the above described valve-stop-execution permission rotational speed, then, it is determined whether or not the crank angle is at a judgment point for execution of the F/C and the valve stop control, that is, whether or not the crank angle which serves as a reference when synchronously performing the F/C and the valve stop control has been reached (step 114). If, as a result, the determination of the present step 114 is positive, the valve stop control is executed (step 116), and further the F/C is executed in synchronization with the execution of the valve stop control (step 108). According to such control, even if an execution request for F/C is issued, the supply of fuel is maintained during a period until the valve stop control is executed and thus the combustion is continued.

On one hand, if, in step 104 described above, it is determined that the engine rotational speed is not higher than the above described valve-stop-execution permission rotational speed under the condition that there is an execution request for the F/C and the valve stop control is not being executed, then it is determined whether or not the temperature of catalyst 68 is not lower than the above described predetermined temperature (step 118). If, as a result, the temperature of the catalyst 68 is not lower than the above described predetermined temperature, the valve stop control and the F/C are synchronously executed (steps 114, 116 and 108), and if the temperature of the catalyst 68 is lower than the predetermined temperature, the F/C is executed without being accompanied by the valve stop control (step 108).

On one hand, if it is determined in step 100 described above that there is no execution request for F/C, then it is determined whether or not the valve stop control is being executed (step 120). If, as a result, it is determined that valve stop control is being executed, then it is determined whether or not the crank angle is at a judgment point for the execution of F/C returning and returning from valve stop control (hereafter, may be referred to as "valve returning"), that is, it is determined whether or not a crank angle which serves as a reference when synchronously performing the F/C returning and the valve returning has been reached (step 122). If, as a result, the determination of present step 122 is positive, the valve returning operation is executed (step 124) and the above described Ne reduction control is cancelled (step 126). Further, the returning from F/C is executed in synchronization with the execution of the valve returning operation (step 128).

Moreover, in the routine shown in FIG. 8, if it is determined in step 102 described above that the valve stop control is being executed under the condition that there is an execution request for F/C, a series of processing after step 130 is executed. That is, first, it is determined whether or not the engine rotational speed has risen to the above described valve-stop-execution permission rotational speed (step 130). To be more specific, as described above, the F/C accompanied by the valve stop control will be performed in a state in which the engine rotational speed is lower than the above described valve-stop-execution permission rotational speed as a result of the execution of the above described Ne reduction control. However, even if the Ne reduction control has been executed, when, for example, a hybrid vehicle nears a steep downslope, there may be a case where the engine rotational speed increases. Step 130 assumes such a case.

If it is determined in step 130 described above that the engine rotating speed has risen to the above described valve-stop-execution permission rotational speed, then, it is determined whether or not the temperature of the catalyst 68 is not lower than the above described predetermined temperature (step 132). If, as a result, it is determined that the temperature of the catalyst 68 is lower than the above described predetermined temperature, the returning from F/C is not performed and the valve returning operation is executed (step 134). On one hand, if it is determined that the temperature of the catalyst 68 is not lower than the above described predetermined temperature, it is determined whether or not the crank angle is at a judgment point for the execution of the F/C returning and the valve returning (step 136). If, as a result, the determination of present step 136 is positive, the valve returning operation is executed (step 138) and the above describe Ne reduction control is cancelled (step 140). Moreover, the returning from F/C is executed in synchronization with the execution of the valve returning operation (step 142).

According to the routine shown in FIG. 8 as described above, when the engine rotational speed is higher than the above described valve-stop-execution permission rotational speed under the condition that there is an execution request for F/C and the temperature of the catalyst 68 is not lower than the above described predetermined temperature, the F/C is executed in synchronization with the execution of the valve stop control after the engine rotational speed is reduced to or below the above described valve-stop-execution permission rotational speed by the above described Ne reduction control. The valve-stop-execution permission rotational speed is specified as already described. Thus, since the engine rotational speed is reduced to a level at which a response time of the valve stop mechanism 98 can be ensured by the control as described above, the valve stop control and the F/C are executed at a timing at which the execution of the F/C and the execution of the valve stop control can be completed in the same cycle. As a result of this, when performing the execution of the F/C accompanied by the valve stop control in a high engine rotational speed range, it is possible to reliably prevent a large amount of fresh air from flowing into the catalyst 68 due to an activation delay of the valve stop mechanism 98, and thereby suppressing the degradation of the catalyst 68. Moreover, by performing control to execute the above described Ne reduction control to forcefully reduce the engine rotational speed to the above described valve-stop-execution permission rotational speed, it is possible to effectively reduce the time from the detecting of the execution request for F/C to the execution of the F/C.

Moreover, according to the routine shown in FIG. 8 described above, even when returning from the valve stop control, as well as when executing the valve stop control, the return operation from the valve stop control and the return operation from the F/C are synchronously performed under the condition that the response time for the valve stop mechanism 98 is ensured by the execution of the above described Ne reduction control. This makes it possible to eliminate the occurrence of a sluggish feel and also prevent the degradation of the exhaust emission performance.

Moreover, as already described, even if the above described Ne reduction control has been executed, when, for example, the hybrid vehicle nears a steep downslope, there may be a case where the engine rotational speed increases above the above described target rotational speed which is controlled by the above described Ne reduction control. According to the routine shown in FIG. 8 described above, in a case where such a situation is encountered during the execution of the valve stop control, when the temperature of the catalyst 68 is not lower than the above described predetermined temperature, the return operation from the valve stop control and the return operation from the F/C are synchronously performed at the above described valve-stop-execution permission rotational speed at which the response time of the valve stop mechanism 98 is ensured (without exceeding the rotational speed). This makes it possible to prevent the occurrence of a delay in the valve return operation with respect to the return operation from the F/C, even while the engine rotational speed is sharply increasing as described above.

Meanwhile, the above described first embodiment is configured such that in a hybrid vehicle equipped with the internal combustion engine 12 including the valve stop mechanism 98, the engine rotational speed is forcefully reduced by reducing the rotational speed of the generator 16. However, the rotational speed reduction means in the present invention is not limited to such method. That is, for example, in an internal combustion engine that uses a continuously variable transmission (CVT) or a multi-stage automatic transmission as the transmission, it may be configured such that control to shift the transmission gear ratio of the CVT or the multi-stage automatic transmission toward an acceleration side is performed to forcefully reduce the engine rotational speed.

Moreover, in the first embodiment described above, description has been made taking example of the mechanical valve stop mechanism 98 that can change the operational states of the intake and exhaust valves 60 and 62 between the valve operating state and the valve closed/stopped state by mechanically transferring the driving force of the driving means 108 to the three pins 104, 106R and 106L via the displacement member 110. However, the valve stop mechanism in the present invention is not limited to those of such configuration. That is, for example, it may be a hydraulic valve stop mechanism that switches between the valve operating state and the valve closed/stopped state by transferring hydraulic force to pins similar to the above described pin 104 and the like.

Moreover, in the first embodiment described above, description has been made taking example of a configuration that switches the operational states of both the intake valves 60 and the exhaust valves 62 into the valve closed/stopped state. However, under the purpose of preventing fresh air from flowing into the catalyst 68 in the present invention, it needs not necessarily be configured such that the operational states of both the intake valves 60 and the exhaust valves 62 are switched into the valve closed and stopped state, and that is to say, it may be configured such that the operational state of only any one of the intake valves 60 and the exhaust valves 62 is switched into the valve closed/stopped state.

Moreover, in the first embodiment described above, it is configured such that in a case where there is an execution request for the fuel cut and the temperature of the catalyst 68 is not lower than the above described predetermined temperature, when the engine rotational speed is higher than the above described valve-stop-execution permission rotational speed, the valve stop control is executed after the engine rotational speed is reduced to the above described valve-stop-execution permission rotational speed, and the fuel cut is executed in synchronization with the execution of the valve stop control. However, the present invention is not necessarily limited to such configuration as that both the controls are synchronously executed. That is, for example, it may be configured such that the execution of the fuel cut is delayed at the same timing when the changing of the operational state of the intake valves 60 and the like into the valve closed/stopped state is delayed until the engine rotational speed decreases to or below the above described predetermined rotational speed. Since the changing to the valve closed/stopped state is delayed according to such control, it is made possible to easily ensure a response time of the valve stop mechanism. Then, by delaying the execution timing of the fuel cut at the same timing when the changing to the valve closed/stopped state is delayed as described above, it is possible to suppress the inflow of fresh air into the catalyst 68 compared with a case where the execution timing of the fuel cut is not delayed as in such a manner.

It is noted that in the first embodiment described above, "fuel cut execution request detecting means" in the above described first invention is implemented by the ECU 40 executing the processing of step 100 described above; "catalyst temperature acquisition means" in the above described first invention by the ECU 40 executing the processing of step 106, 118 or 132 described above; and "valve stop execution means" in the above described first invention by the ECU 40 executing step 116 described above when the determinations of steps 100, 104, 106 and 112 described above are positive.

Moreover, "rotational speed reduction means" in the above described second invention is implemented by the ECU 40 performing the processing of step 110 described above.

Furthermore, "fuel cut delaying means" of the above described third invention is implemented by the ECU 40 performing the processing of step 108 described above when the determinations of steps 100, 104, 106 and 112 described above are positive.

The invention claimed is:

1. A control apparatus for an internal combustion engine, comprising:
   a valve stop mechanism which is capable of changing an operational state of at least one of an intake valve and an exhaust valve between a valve operating state and a valve closed/stopped state by displacing at least one member in a direction substantially parallel to a camshaft;
   fuel cut execution request detecting means which detects a presence or absence of an execution request for fuel cut during operation of an internal combustion engine;
   catalyst temperature acquisition means which acquires a temperature of a catalyst disposed in an exhaust passage of the internal combustion engine;
   valve stop execution means which changes an operational state of at least one of the valves into a valve closed/stopped state, after an engine rotational speed decreases to or below a predetermined rotational speed, in a case where the execution request for fuel cut is detected, the temperature of the catalyst is not lower than a predetermined temperature and the internal combustion engine is in a rotational speed range higher than the predetermined rotational speed range; and
   fuel cut delaying means which delays the execution of fuel cut at the same timing when the changing of the operational state of the at least one of the valves into the valve closed/stopped state is delayed until the engine rotational speed decreases to or below the predetermined rotational speed, in a case where the execution request for fuel cut is detected,
   wherein the predetermined rotational speed is an engine rotational speed at which it is possible to obtain a response performance of the valve stop mechanism which is needed to complete the changing of the operational state of the at least one of the valves by displacing the at least one member and the execution of fuel cut in a same cycle, in a case where the changing of the operational state of the at least one of the valves into the valve closed/stopped state and the execution of fuel cut are commanded at the same time.

2. The control apparatus for an internal combustion engine according to claim 1, further comprising:
   rotational speed reduction means which forcefully reduces the engine rotational speed to or below the predetermined rotational speed, when the engine rotational speed is higher than the predetermined rotational speed in a case where the execution request for fuel cut is detected.

3. The control apparatus for an internal combustion engine according to claim 1,
   wherein the fuel cut delaying means executes the fuel cut in synchronization with the execution of an operation to change the operational state of the at least one of the valves into the valve closed/stopped state by the valve stop execution means.

4. A control apparatus for an internal combustion engine, comprising:
   a valve stop mechanism which is capable of changing an operational state of at least one of an intake valve and an exhaust valve between a valve operating state and a valve closed/stopped state by displacing at least one member in a direction substantially parallel to a camshaft; and
   circuitry configured as:
      a fuel cut execution request detecting unit which detects a presence or absence of an execution request for fuel cut during operation of an internal combustion engine;
      a catalyst temperature acquisition unit which acquires a temperature of a catalyst disposed in an exhaust passage of the internal combustion engine;
      a valve stop execution unit which changes an operational state of at least one of the valves into a valve closed/stopped state after an engine rotational speed decreases to or below a predetermined rotational speed, in a case where the execution request for fuel cut is detected, the temperature of the catalyst is not lower than a predetermined temperature and the internal combustion engine is in a rotational speed range higher than the predetermined rotational speed range; and
      a fuel cut delaying unit which delays the execution of fuel cut at the same timing when the changing of the operational state of the at least one of the valves into the valve closed/stopped state is delayed until the engine rotational speed decreases to or below the predetermined rotational speed, in a case where the execution request for fuel cut is detected,
   wherein the predetermined rotational speed is an engine rotational speed at which it is possible to obtain a response performance of the valve stop mechanism which is needed to complete the changing of the operational state of the at least one of the valves by displacing the at least one member and the execution of fuel cut in a same cycle, in a case where the changing of the operational state of the at least one of the valves into the valve closed/stopped state and the execution of fuel cut are commanded at the same time.

* * * * *